US009670907B2

(12) United States Patent
Bengtson et al.

(10) Patent No.: US 9,670,907 B2
(45) Date of Patent: Jun. 6, 2017

(54) WIND TURBINE CONTROL SYSTEM WITH DECENTRALIZED VOTING

(75) Inventors: John Bengtson, Aarhus (DK); Victor Donescu, Westford, MA (US); Philip Carne Kjær, Aarhus (DK); Kenneth Skaug, Beder (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 887 days.

(21) Appl. No.: 14/008,666

(22) PCT Filed: Mar. 28, 2012

(86) PCT No.: PCT/DK2012/050094
§ 371 (c)(1),
(2), (4) Date: Dec. 11, 2013

(87) PCT Pub. No.: WO2012/130244
PCT Pub. Date: Oct. 4, 2012

(65) Prior Publication Data
US 2014/0086723 A1 Mar. 27, 2014

Related U.S. Application Data

(60) Provisional application No. 61/469,209, filed on Mar. 30, 2011.

(30) Foreign Application Priority Data

Jun. 24, 2011 (DK) ................................ 2011 70325

(51) Int. Cl.
*F03D 7/00* (2006.01)
*F03D 11/00* (2006.01)
(Continued)

(52) U.S. Cl.
CPC .......... *F03D 11/0091* (2013.01); *F03D 7/047* (2013.01); *F03D 17/00* (2016.05);
(Continued)

(58) Field of Classification Search
CPC ...... F03D 11/0091; F03D 17/00; F03D 7/047; G05B 9/03; F05B 2260/845; F05B 2270/1074; Y02E 10/723
See application file for complete search history.

(56) References Cited

U.S. PATENT DOCUMENTS 5,919,267 A 7/1999 Urnes et al.
6,002,970 A 12/1999 Abdelnour et al.
(Continued)

FOREIGN PATENT DOCUMENTS

| DE | WO 2005021962 A1 * | 3/2005 | ........... F03D 7/0224 |
| DK | WO 2009109467 A2 * | 9/2009 | ............. F03D 7/043 |
| DK | WO 2009109655 A1 * | 9/2009 | ............. F03D 7/042 |
| EP | 2085839 A1 | 8/2009 | |
| EP | 2346155 A1 | 7/2011 | |

OTHER PUBLICATIONS

Communication Pursuant to Article 94(3) EPC for EP 12714205.7, Nov. 13, 2014.
(Continued)

*Primary Examiner* — Richard Edgar
(74) *Attorney, Agent, or Firm* — Patterson + Sheridan, LLP

(57) ABSTRACT

The present invention relates to a fault-tolerant control system for a wind turbine comprising a plurality of controllable wind turbine components, the control system comprising control means for generating a replica of essentially concurrent set-point values, a data communication network for transmitting the replica of essentially concurrent set-point values to the plurality of wind turbine components, and a plurality of decentralized voting means being arranged so that a decentralized voting means is assigned to each wind turbine component, each decentralized voting means being adapted to select one set-point value out of the replica of set-point values. The present invention further relates to a wind turbine and to an associated method.

20 Claims, 13 Drawing Sheets

(51) Int. Cl.
*F03D 7/04* (2006.01)
*G05B 9/03* (2006.01)
*F03D 17/00* (2016.01)

(52) U.S. Cl.
CPC .......... *G05B 9/03* (2013.01); *F05B 2260/845* (2013.01); *F05B 2270/1074* (2013.01); *Y02E 10/723* (2013.01)

(56) References Cited

U.S. PATENT DOCUMENTS

| | | | |
|---|---|---|---|
| 7,256,508 B2* | 8/2007 | Altemark | F03D 9/003 290/44 |
| 8,585,363 B2* | 11/2013 | Jeppesen | F03D 7/0224 416/1 |
| 2008/0118354 A1 | 5/2008 | Jeppesen et al. | |
| 2009/0309360 A1 | 12/2009 | Jurkat | |
| 2010/0262263 A1 | 10/2010 | Karaffa et al. | |
| 2012/0020786 A1* | 1/2012 | Ayres | F03D 7/047 416/1 |

OTHER PUBLICATIONS

International Search Report and Written Opinion, PCT/DK2012/050094, Nov. 14, 2012.
Danish Search Report, PA 2011 70325, Feb. 7, 2012.

* cited by examiner

WIND TURBINE CONTROL SYSTEM WITH DECENTRALIZED VOTING

FIELD OF THE INVENTION

The present invention relates to a fault-tolerant wind turbine control system comprising a decentralized voting scheme, said decentralized voting scheme aiming at selecting the most reliable wind turbine set-point value among a plurality of available wind turbine set point values.

BACKGROUND OF THE INVENTION

Fault-tolerant control systems are typically implemented as redundant systems comprising duplicates of various important modules/devices. In case an important module/device fails its functionality is taken over by a similar module/device.

EP 2 080 903 A1 discloses a fail-safe control system for wind turbine applications. According to EP 2 080 903 A1 a first control unit performs so-called critical control functions, whereas a second, and separate, control unit performs so-called non-critical control functions. The first and second control units are coupled to each other via a network. EP 2 080 903 A1 discusses the disadvantages associated with redundant wind turbine control systems, where critical control units are doubled. However, as specified in [0014] of EP 2 080 903: "Further, control functions of the first set may also be redundantly included in the second set, to provide graceful degradation within the overall control system."

US 2009/0309360 and US 2009/0309361 discuss a method and a system for controlling a wind energy park. In US 2009/0309360 and US 2009/0309361 a main communication unit controls a number of prioritised control units. In case a given control unit with a given priority fails, the main communication unit selects a lower prioritised control unit to take over the functionality of the defective control unit.

It is a disadvantage of the method and system suggested in US 2009/0309360 and US 2009/0309361 that the main communication unit selects which control unit to take over in case another control unit breaks down or in any other way malfunctions. However, in case the main communication unit itself breaks down, no replacement unit is available. Thus, the control method and the control system suggested in US 2009/0309360 and US 2009/0309361 can not be considered a fault-tolerant control method/system—at least not on the main communication unit level.

It may be seen as an object of embodiments of the present invention to provide a fault-tolerant wind turbine control system.

DESCRIPTION OF THE INVENTION

The above-mentioned object may be complied with by providing, in a first aspect, a fault-tolerant control system for a wind turbine comprising a plurality of controllable wind turbine components, the control system comprising
control means for generating a replica of essentially concurrent set-point values,
a data communication network for transmitting the replica of essentially concurrent set-point values to the plurality of wind turbine components, and
a plurality of decentralised voting means being arranged so that a decentralised voting means is assigned to each wind turbine component, each decentralised voting means being adapted to select one set-point value out of the replica of set-point values.

Wind turbine components to be controlled may be pitch, yaw, main shaft, gear, generator, power stop, hydraulic station, water pump, cooling, uninterruptable power supply (UPS) or metrology station.

The following advantages are associated with the first aspect of the present invention:
1. The control system architecture of the present invention fulfils the high requirements to reliability that is posed on modern wind turbines control.
2. The control system architecture of the present invention integrates functional safety and is able to support both low demand modes, high demand modes and continuous mode classes of safety-related functions as specified in the IEC61508 standard.
3. The control system architecture of the present invention is scalable and composable in a way that enables tailoring of functionality to various wind turbine platforms layouts.

The control system architecture of the present invention generally reflects the established design principle "form follows function". The control system architecture may comprise wind turbine sub-systems adapted to control one or more of the above-mentioned wind turbine components.

The presented control system architecture may utilize a number of sub-systems that may have inherent fault-tolerance by replicated distributed control nodes (DCNs). Moreover, the presented control system architecture may utilize a fault-tolerant real-time communication network (RTCN).

The control functions of the wind turbine sub-systems are performed by DCNs and additional electrical components as e.g. sensors, relays, motor starters, contactors or solid-state relays. A DCN can also serve as e.g. sensor interface. The DCNs may integrate safety-related functions that support fault-tolerant functional safety at node and system level.

The fault-tolerant control may further comprise centralised main controller means adapted to generate reference signals for the control means for generating the replica of essentially concurrent set-point values.

Moreover, the fault-tolerant control system may further comprise a fault-tolerant sensor system comprising a plurality of sensors, said plurality of sensors being arranged in a redundant manner. The plurality of sensors may be adapted to measure at least one electrical parameter.

The data communication network may comprise a real-time communication network, such as a time-triggered Ethernet. The time-triggered Ethernet communication network may be implemented as a single fault-tolerant network, a double fault-tolerant network or a multi fault-tolerant network. The real-time communication network may support safety-related communication of data. Moreover, means for establishing a global time may be provided.

In a second aspect the present invention relates to a wind turbine comprising a fault-tolerant control system according to the first aspect. The plurality of controllable wind turbine components may be selected from the group consisting of: pitch, yaw, main shaft, gear, generator, power stop, hydraulic station, water pump, cooling, UPS or metrology station.

In a third aspect the present invention relates to a method for controlling a wind turbine comprising a plurality of controllable wind turbine components, the method comprising the steps of
generating a replica of essentially concurrent wind turbine component set-point values, transmitting the set-point values to the wind turbine components in the wind turbine via a data communication network, performing, at each wind turbine component, a decentralised voting process comprising the step of selecting one set-point value out of the replica of set-point values, and applying the selected set-point value to a wind turbine component.

The selected set-point value may be applied to a single wind turbine component or to a number of wind turbine components within the wind turbine. As previously mentioned said wind turbine components to be controlled may be pitch, yaw, main shaft, gear, generator, power stop, hydraulic station, water pump, cooling, UPS or metrology station.

BRIEF DESCRIPTION OF THE DRAWINGS

The present invention will now be explained in further details with reference to the accompanying figures, where.

Figure 1:
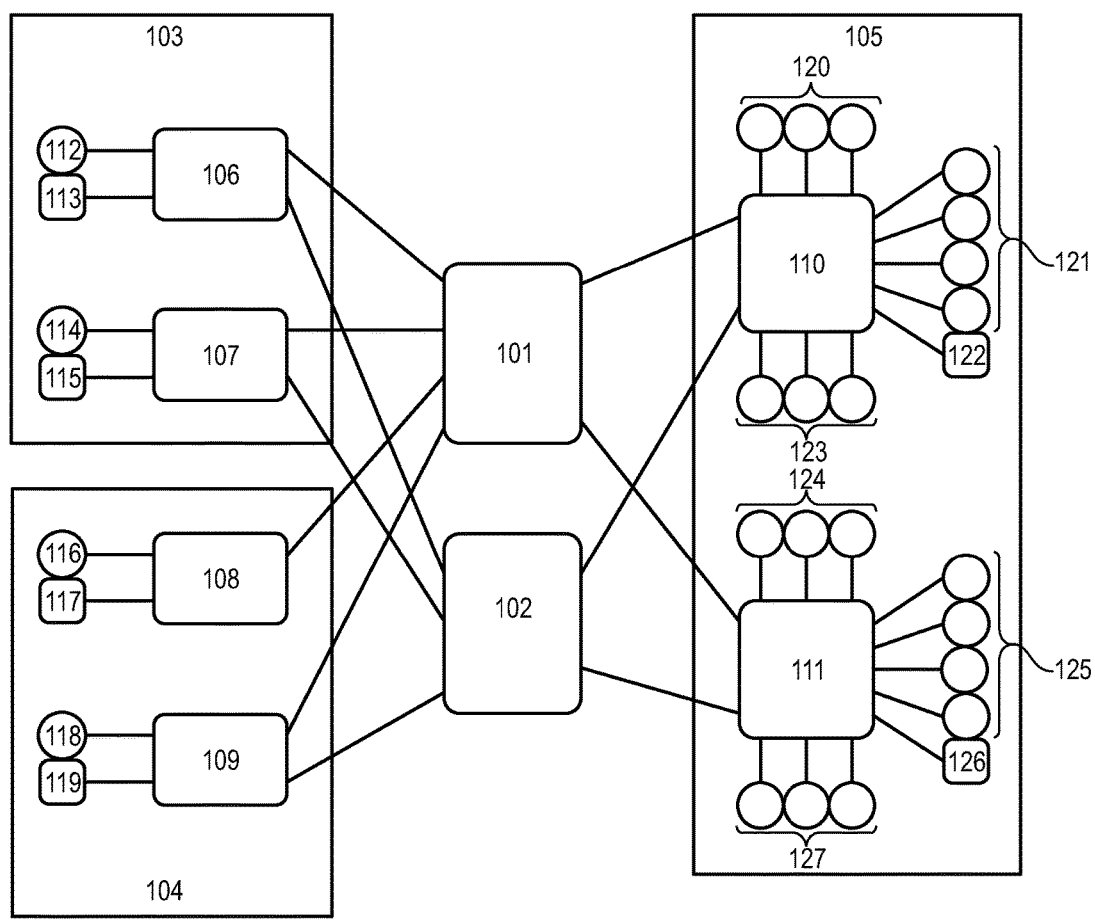
FIG. 1 shows an exemplified fault-tolerant control structure in a wind turbine.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims. The application of this invention is not limited to a wind turbine generator machine but extends to the low speed high torque applications like lifts and conveyors that employ PM machines which normally operate at motoring mode operation.

DETAILED DESCRIPTION OF THE INVENTION

In general, the present invention aims at providing a fault-tolerant control system for wind turbines. In wind turbines, fault-tolerant control is accomplished by providing a method and a system that support decentralized voting— i.e. where the selection of a set-point is performed at the site of a wind turbine component. A wind turbine component set-point may for example reflect the power (active and/or reactive), the frequency, the voltage or the current to be generated by the wind turbine. Wind turbine component set-points may also reflect other parameters such as pitch angle, temperature of cooling fluids etc.

The present invention relies on a wind turbine data communication network which should be highly reliable and have capabilities that guarantee delivery of data within a specified deadline with very high probability. Suitable networks could be Ethernet/IP, Ethernet POWERLINK, EtherCAT, SERCOS III, PROFInet-IRT, TTEthernet or other data communication networks with similar properties.

The following description will use the term "RTCN" (Real-Time Communication Network) as a generic term for a communication network with the desired properties.

FIG. 1 shows an example of a fault-tolerant system of a wind turbine. In FIG. 1 three redundantly arranged DCNs 106-111 each serving a given wind turbine generator (WTG) module 103-105 including sensors 112, 114, 116, 118, 120, 121, 123, 124, 125, 127 and actuators 113, 115, 117, 119, 122, 126 are interconnected by a redundant RTCN via two RTCN switches 101, 102. Thus, data from sensors and actuators within each WTG module 103-105 is passed to/from the RTCN via redundantly arranged DCNS 106-111. For example, in WTG module 103, redundantly arranged DCNS 106, 107 connects sensors 112, 114 and actuators 113, 115 to RTCN switches 101, 102, respectively. If for example DCN 106 fails, DCN 107 including sensor 114 and actuator 115 takes over in regard of WTG module 103.

In general, data can be utilized by DCNs in 2oo2 (2 out of 2) or 2oo3 (2 out of 3) redundancy schemes depending on the criticality of the function. In case of failure in one DCN, continued operation is ensured by the replicated node within the same WTG module, see the above example. If both DCNs within a given WTG module operate on data available from the RTCN and if measures are taken to ensure that the DCNs operate on the same data, replica determinism can be supported.

RTCNs can combine the advantages of the time triggered communication paradigm with the flexibility of the wide spread Ethernet. They thus support standard Ethernet traffic while ensuring non-interference with the critical data traffic. Utilization of such communication networks is considered advantageous in relation to the present invention.

The time-triggered communication paradigm supports the establishment of replica determinism. In such communication paradigms, the communication of real-time data on the RTCN is planned in the design phase and the associated replica deterministic distributed control nodes have a priori knowledge of when data is available. This property enables that two or more replicated DCNs by subscription can be guaranteed to operate on same data, execute the same functions at the same time, and thus be replica deterministic, or it enables e.g. two main controllers to operate on the same data and produce the same output at the same time and thus be replica deterministic.

RTCNs can provide functionality, e.g. switch functions, with specific properties that support "continuous mode" safety-related functions as defined in the IEC61508 standard. Continuous mode safety functions would depend on safety-related data communicated on the RTCN to perform its safety function. Such network type could be TTEthernet. By utilizing this type of communication network, the capability of the fault-tolerant architecture of the present invention can be extended to comprise continuous mode safety functions.

Figure 7:
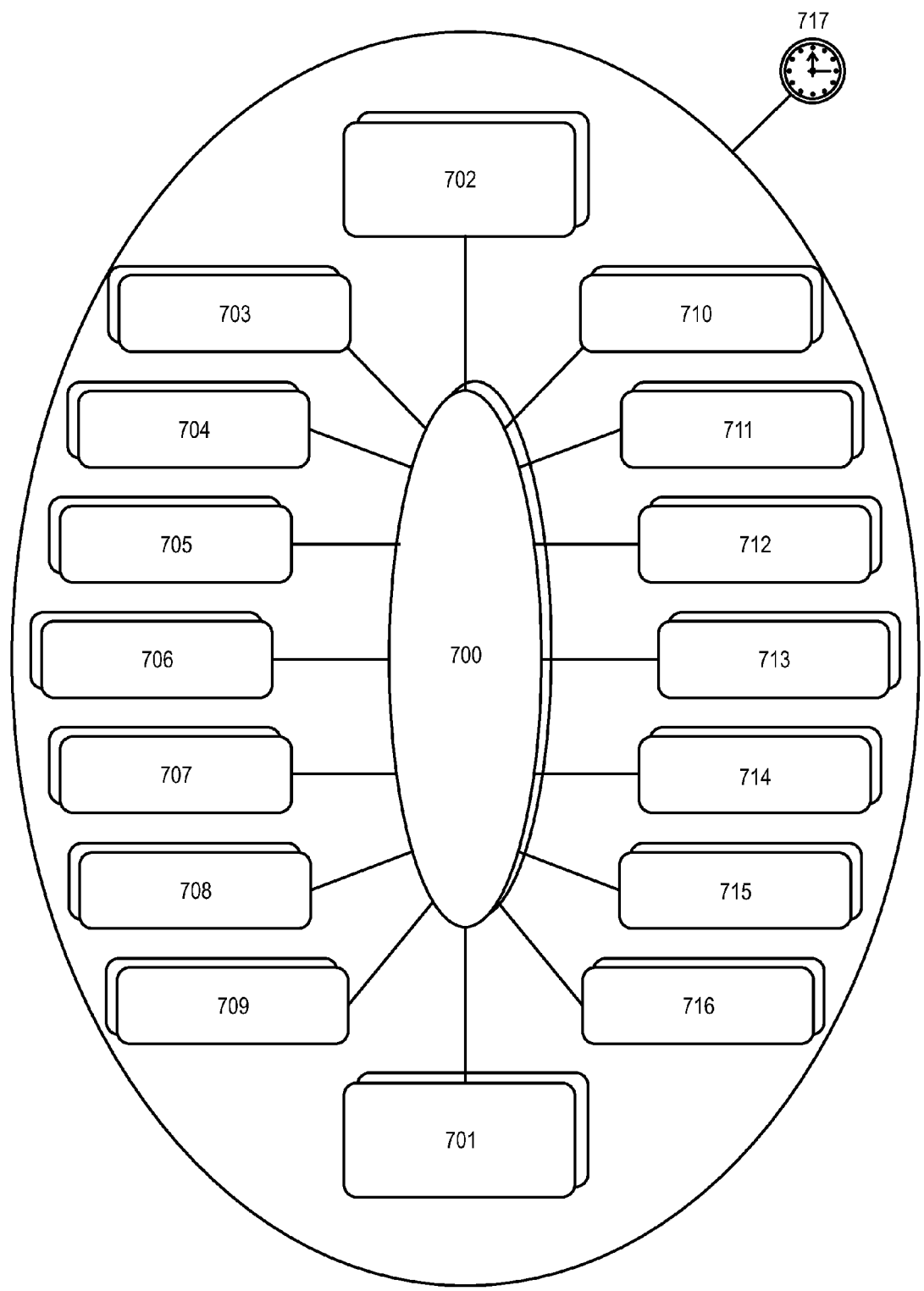
FIG. 7 illustrates precision global time.

In distributed control systems, fault-tolerance and real-time properties can be supported by the establishment of a precise global time where the controllers and DCNs have a common notion of time that deviates very little—typically in the range of a microsecond or less, however not limited to this precision, see FIG. 7 and the associated description.

The global time within distributed control systems support:
- Synchronization of data acquisition across controllers and DCNs
- Synchronization of processes across controllers and DCNs
- Synchronization of data communication (time-triggered communication)
- Replica determinism in fault-tolerant controllers and DCNs The global time can be established by implementation of an IEEE-1588 compatible Precision Time Protocol in the wind turbine. Alternatively, the global time can be established by utilizing the inherent support for a precision global time that is part of many industrial RTCNs. In systems where the precision global time is critical to system availability and/or safety, a sufficient level of fault-tolerance and reliability must be established in the distribution of the precision global time to support this.

Figure 2:
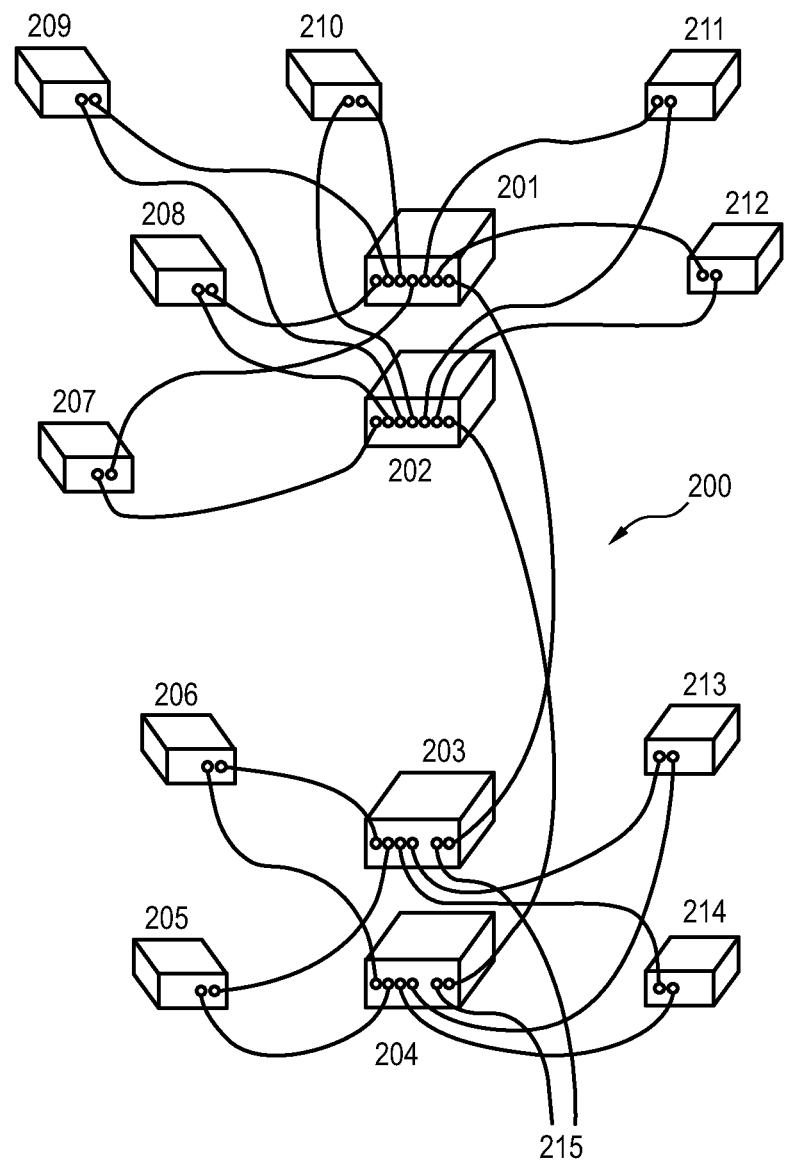
FIG. 2 shows an exemplified single fault-tolerant time triggered Ethernet.

Referring now to FIG. 2, the DCNs 205-214 in the fault-tolerant control system are configured to form a redundant RTCN 200. FIG. 2 exemplifies a single fault-tolerant RTCN 200 applying redundantly arranged communication switches 201-204, where switches 201, 202 and switches 203, 204 are redundantly arranged/replicated. Each of the DCNs are connected to two communication switches. This structure satisfies the fault-tolerance required for high system reliability. A connection 215 to other communication switches/RTCNs is also available.

Figure 3:
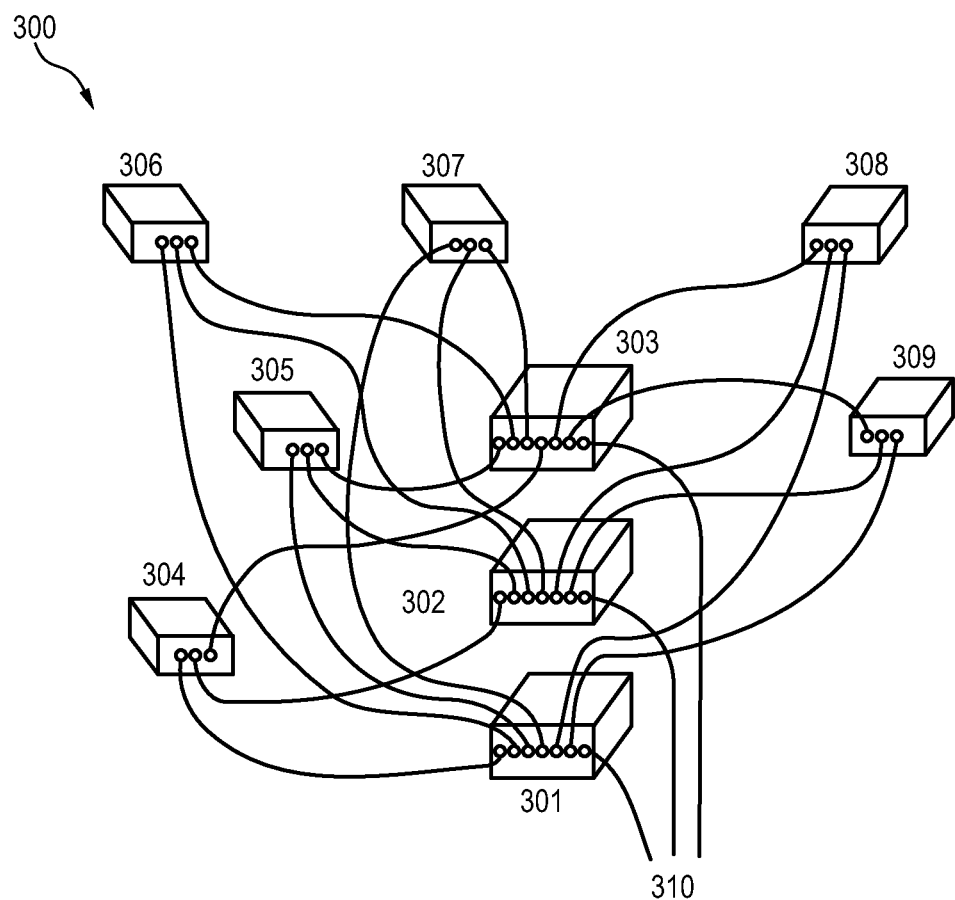
FIG. 3 shows an exemplified double fault-tolerant time triggered Ethernet.

FIG. 3 exemplifies a double fault-tolerant RTCN 300 applying triple redundant communication architecture. Each of the DCNs 304-309 are connected to three of the redundantly arranged communication switches 301-303. This network architecture satisfies the fault-tolerance required for very high system reliability and for fault-tolerant systems with long mean time to repair after the first failure. Again, a connection 310 to other communication switches/RTCNs is available.

In a distributed control system, fault-tolerance is obtained by replication of communication channels and of the DCNs, see FIGS. 2 and 3. The RTCN itself can be double (FIG. 2) or triple (FIG. 3) redundant. The distributed controllers can be replicated in two, three or more depending on the reliability requirement to each sub-system and on the chosen fault-tolerant architecture for the sub-system. Connections to other RTCNs may also be provided.

Preferably, DCNs exhibit "fail-silent" behaviour in order to let the replicated node(s) maintain control over the controlled object. This property must remain stable until service on the faulty unit has restored the system. This means that the fail-silent behaviour must be maintained with a very high probability in case of a second failure in the already faulty node. Otherwise the faulty node may disturb the operation of the wind turbine and possibly cause a critical system failure.

The fault-tolerant control system architecture according to the present invention supports three different control classes—these control classes support the requirements in wind turbine related applications.

1. Fault-Tolerant, Non Safety-Related: This control class covers all controls that do not have safety-related properties. The fault-tolerance allows continued operation of the turbine in case of component failure. Single, double, or multiple fault tolerance can be supported by the architecture.

2. Fault-Tolerant, Safety-Related, Fail-To-Safe: This control class covers safety-related controls that immediately can enter a safe state in case of a critical failure in the system while at the same time providing fault-tolerance that allows continued operation of the turbine in case of component failure. Single, double, or multiple fault tolerance can be supported by the architecture.

3. Fault-Tolerant, Safety-Related, Continuous Mode: This control class covers safety-related controls that do not have an immediate safe state in case of a critical failure. The fault-tolerance allows continued operation in case of component failure. Single, double, or multiple fault tolerance can be supported. This class of control may require a RTCN with specific features that guarantee the integrity of safety-critical data traffic.

Figure 4:
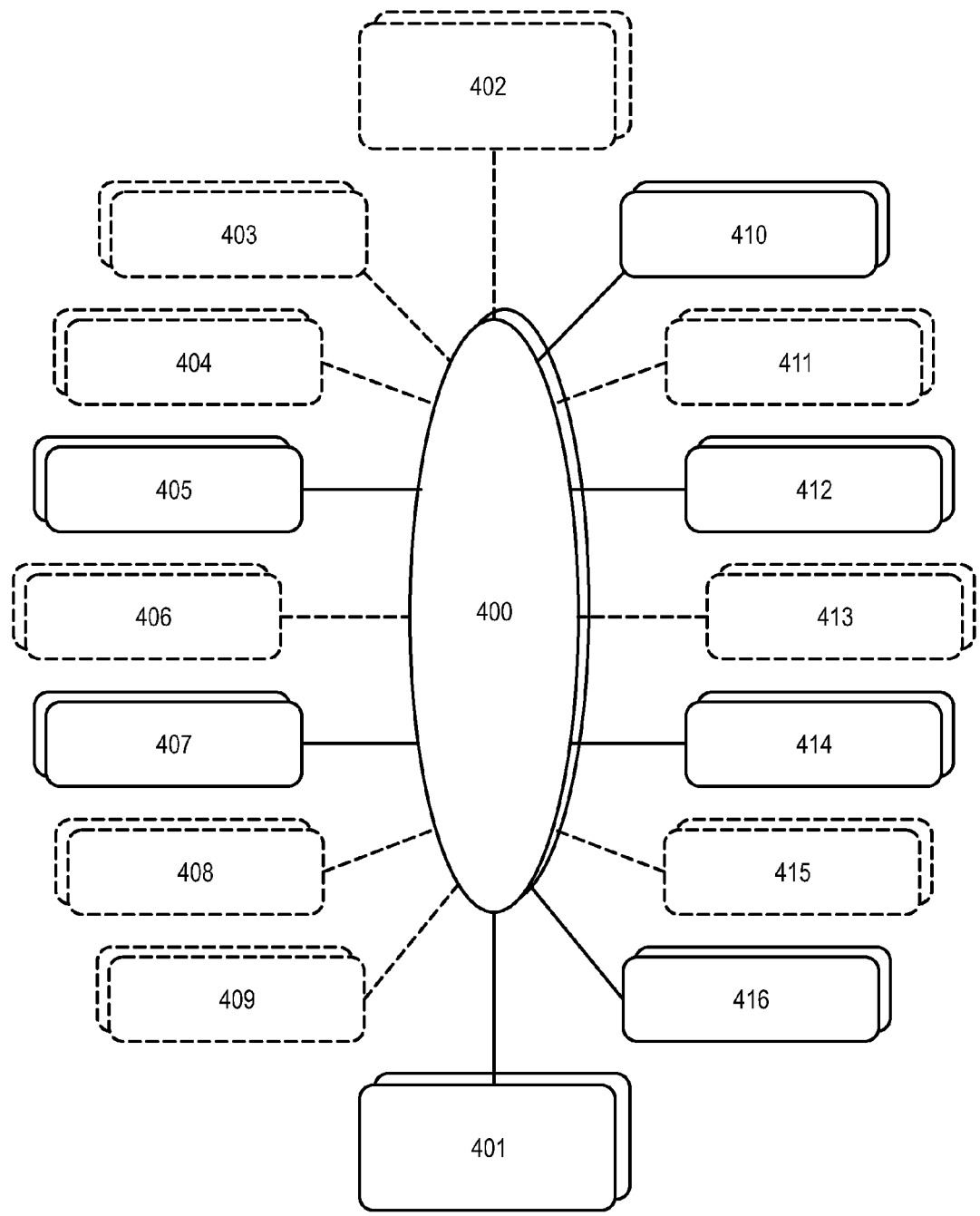
FIG. 4 shows the non safety-related system architecture.
Figure 6:
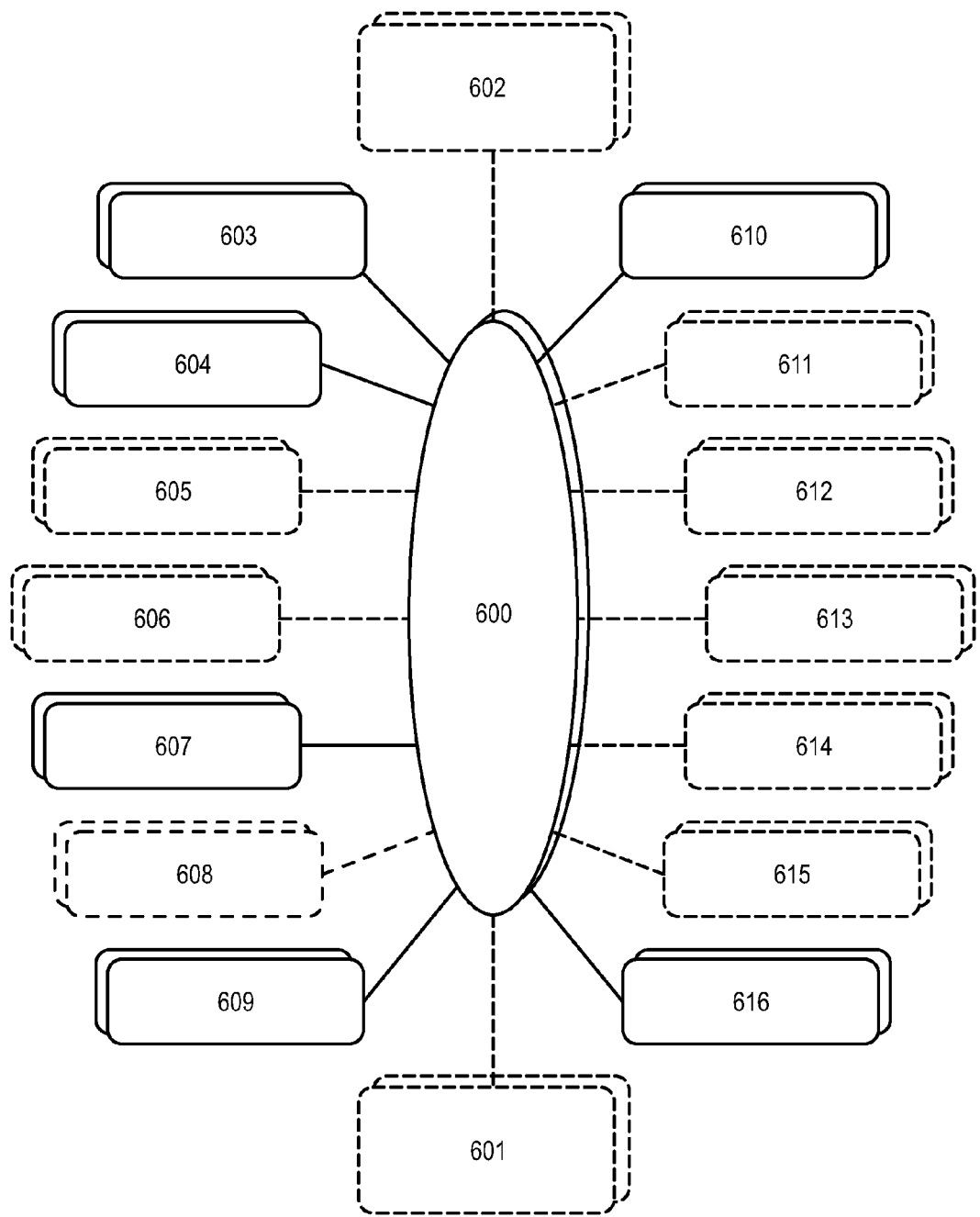
FIG. 6 shows the distributed control system architecture.

Moreover, the fault-tolerant control system architecture according to the present invention supports three different execution domains with different execution paradigms:

1. Centralized master non safety-related execution domain, see FIG. 4.
2. Centralized master safety-related execution domain, see FIG.
3. Distributed control execution domain, see FIG. 6.

The RTCN serves as a shared communication backbone for the functions in these execution domains. Data can be exchanged between producing nodes and consuming nodes by appropriate message patterns as e.g. the publish/subscribe or other suitable pattern.

The Centralized Master Non Safety-Related Execution Domain comprises functions related to normal control of the wind turbine. Execution in this domain is characterized in a replicated master-slave paradigm utilizing one or more main controllers 401 and replica DCNs 405, 407, 410, 412, 414, 416 interconnected by replicated RTCN 400, see the solid line elements of FIG. 4. The dashed line elements are inactive in this domain. When utilizing a deterministic RTCN 400, this domain supports fault-tolerance by redundant replica deterministic DCNs 405, 407, 410, 412, 414, 416. The replication of the RTCN 400 and the DCNS 405, 407, 410, 412, 414, 416 are illustrated as stacked structures (of RTCN and DCNs) in FIG. 4.

Figure 5:
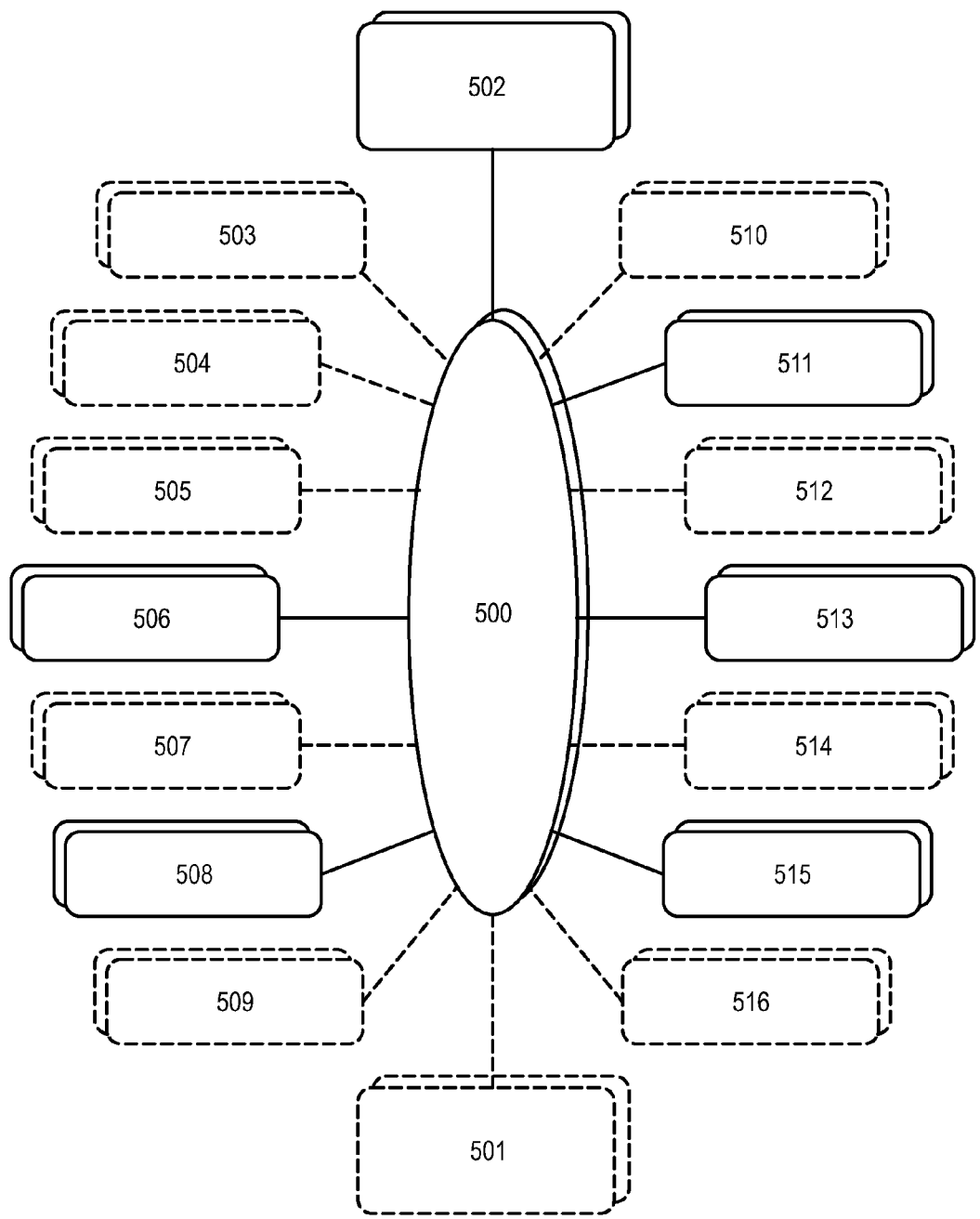
FIG. 5 shows the fail-to-safe safety-related system architecture.

The Centralized Master Safety Control Execution Domain comprises safety-related functions related to protection of persons or assets. Execution in this domain is characterized in a centralized master paradigm utilizing replicated master safety controllers 502 (solid line) and associated replicated safety-related DCNs 506, 508, 511, 513, 515 (solid line), see FIG. 5. The replicated controllers 502 and the replicated DCNs 506, 508, 511, 513, 515 are interconnected by replicated RTCN 500 (solid line). The dashed line elements are inactive is this domain. When utilizing a deterministic RTCN, this domain supports fault-tolerance by redundant replica deterministic DCNs.

The Distributed Control Execution Domain enables a master-less approach to control. The approach supports fault-tolerance by redundant replica deterministic DCNs 603, 604, 607, 609, 610, 616 interconnected via replicated RTCN 600, see the solid line elements of FIG. 6. The dashed line elements are inactive. This domain applies no master controller(s) and the primary area of application for this domain is continuous-mode safety-related control. However, this paradigm can also be used in relation to safety-related and non safety-related controls.

In general, fault-tolerant main controllers, master safety controllers and DCNs can operate in either, active mode, passive stand-by mode, or cold stand-by mode depending on the requirements in the controlled wind turbine sub-system.

Active mode is utilized in case loss of real-time control is critical. The nodes are operated as replica deterministic which mean that they operate on the same data and produce the same output at essentially the same time (essentially concurrent data/control output). Replica deterministic properties can apply to all controller types in the control system including but not limited to, main controllers, master safety controllers and DCNs. The control outputs of a fault-tolerant set of DCNs are combined and implicitly voted in the actuator interface or actuator system. This redundancy scheme does not cause temporary loss of control if one distributed control node fails. A pre-requisite for fault-tolerance by replicated DCNs is a predictable behaviour of a failed node. The desired failure mode is fail-silent.

In passive stand-by mode, only one node in a redundant wind turbine sub-system is active and the other node(s) are ready to assume control if the first node fails. DCN control outputs may still be combined and implicitly voted in the actuator system, but only one node is active in the control. This redundancy scheme could be utilized if temporary loss of control function is non-critical for the duration of integration of the passive stand-by node. The passive stand-by mode requires that the passive node has a means of detecting whether the active node has failed. This can be accomplished by supervision of the function, by a membership service, by an agreement protocol between the nodes or by an agreement protocol between the passive node and the related controller.

In cold stand-by mode, only one node in a redundant sub-system is active and the other node(s) are powered down. They must be powered up to assume control. DCN control outputs may still be combined and implicitly voted in the actuator system, but only one node is active in the control. This redundancy scheme could be utilized if temporary loss of control function is non-critical for the duration of start-up and integration of the cold stand-by node. The cold stand-by mode requires that the system has a means of detecting whether the active node has failed and subsequently activating the cold stand-by node. Activation could be controlled from the related controller.

In order to guarantee the desired reliability and safety of fault-tolerant control systems in wind turbine applications, the nodes in the system must guarantee that the fail-silent property will remain valid during the operational lifetime with a very high probability.

As stated above with reference to FIG. 7 fault-tolerance and real-time properties in distributed control systems can be supported by the establishment of a precise global time 717 where the replicated controllers 701, 702 and replicated DCNs 703-716 have a common notion of time that deviates very little—typically in the range of a microsecond or less, see FIG. 7. In FIG. 7 a replicated RTCN 700 interconnects replicated controllers 701, 702 and replicated DCNs 703-716. The replicated controllers 701, 702 and replicated DCNs 703-716 may be of the same types as disclosed in connection with the domains illustrated in FIGS. 4-6.

Single Fault-Tolerance

A single fault-tolerant architecture in sub-systems, such as in one of the WTG modules 103-105 of FIG. 1, will in most cases be sufficient to comply with the reliability requirements in wind turbines.

Figure 8:
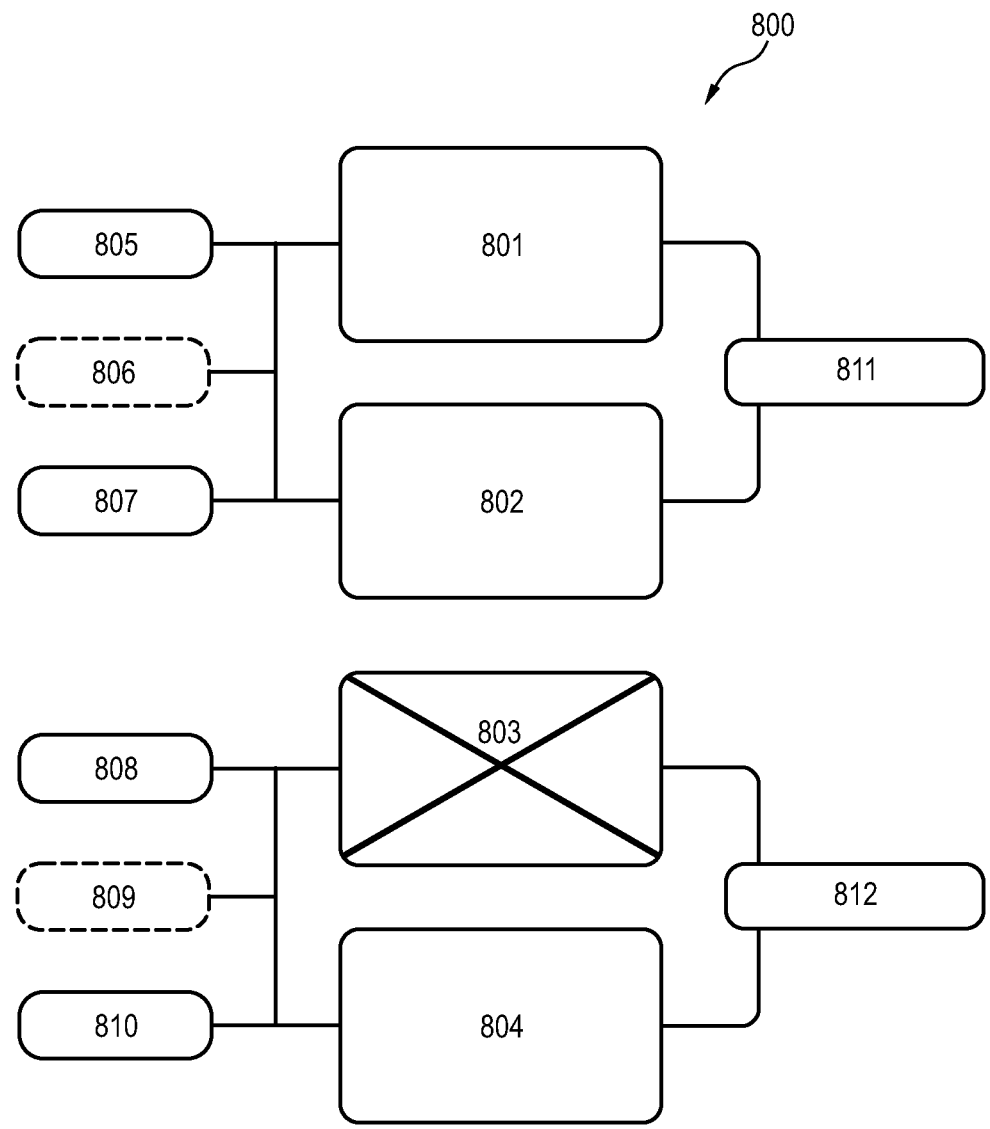
FIG. 8 shows an exemplified single-fault scenario in a single fault-tolerant system.

FIG. 8 shows a generic reliability network view on fault-tolerant fail silent DCNs 801-804 in a wind turbine sub-system of a fault-tolerant control system 800. The DCNs 801-804 can be implemented as active replicated nodes or as passive or cold stand-by nodes. Sensor values from sensors 805-810 are available to the DCNs 801-804 as data on RTCN and optionally also as local sensor data. Data can be utilized by the controllers in 2oo2 (2 out of 2) or 2oo3 (2 out of 3) redundancy schemes depending on the criticality of the function.

The upper drawing of FIG. 8 shows a wind turbine sub-system for controlling object 811 under normal working conditions. Replicated sensors 805-807 provide data to replicated DCNs 801 802 in order to control object 811.

A failure situation is depicted in the lower drawing of FIG. 8. In case of failure in one DCN 803, continued operation is ensured by the replicated node 804. Thus, even though DCN 803 fails sensor signals from sensors 808-810 may still be applied to control object 812 via DCN 804.

If both DCNs 801, 802 or 803, 804 operate on data available from the RTCN and not on internal data and if measures are taken to ensure that the DCNs operate on the same data, replica determinism can be supported.

Figure 9:
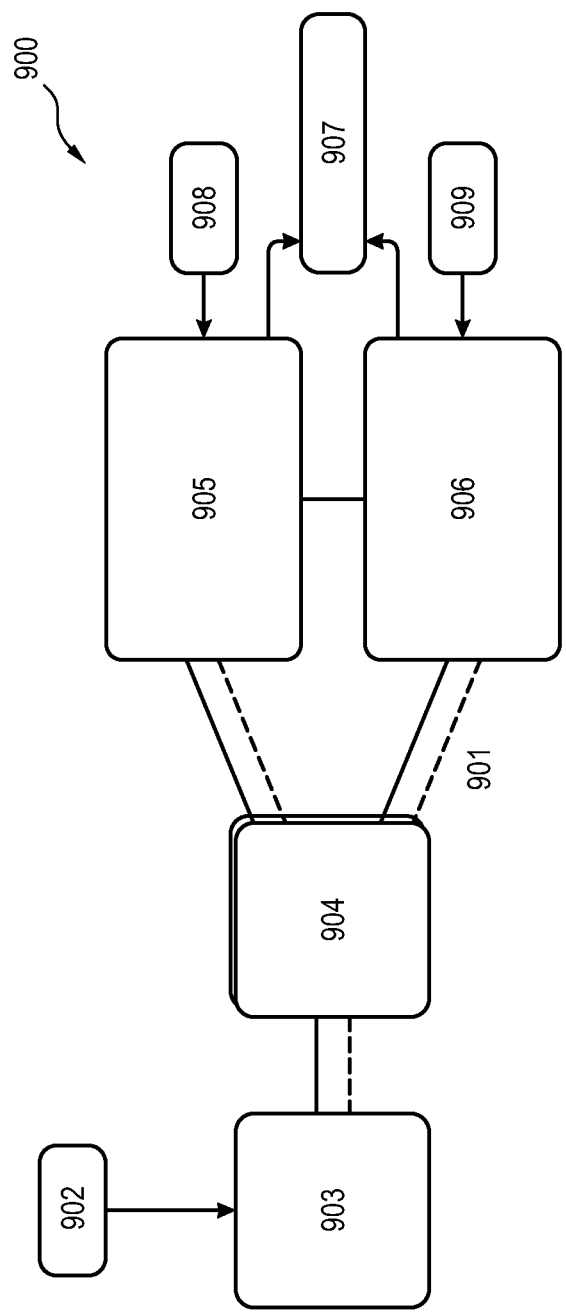
FIG. 9 shows an implementation view of a single fault-tolerant system.

The implementation of the single fault-tolerant units in the fault-tolerant control system 900 for controlling object 907 is exemplified in FIG. 9. Sensors 908, 909 are connected to the replicated fail silent DCNs 905, 906 and possibly to another DCN 903 in the system. Sensor data from sensor 902 is made available on the RTCN 901 via DCN 903 and replicated RTCN switch 904. The solid and dashed lines of the RTCN illustrate the single redundancy of the RTCN 901.

Double Fault-Tolerance

In wind turbine sub-systems where reliability or safety requirements cannot be sustained by the single fault-tolerant architecture, double fault-tolerance can be utilized.

Figure 10:
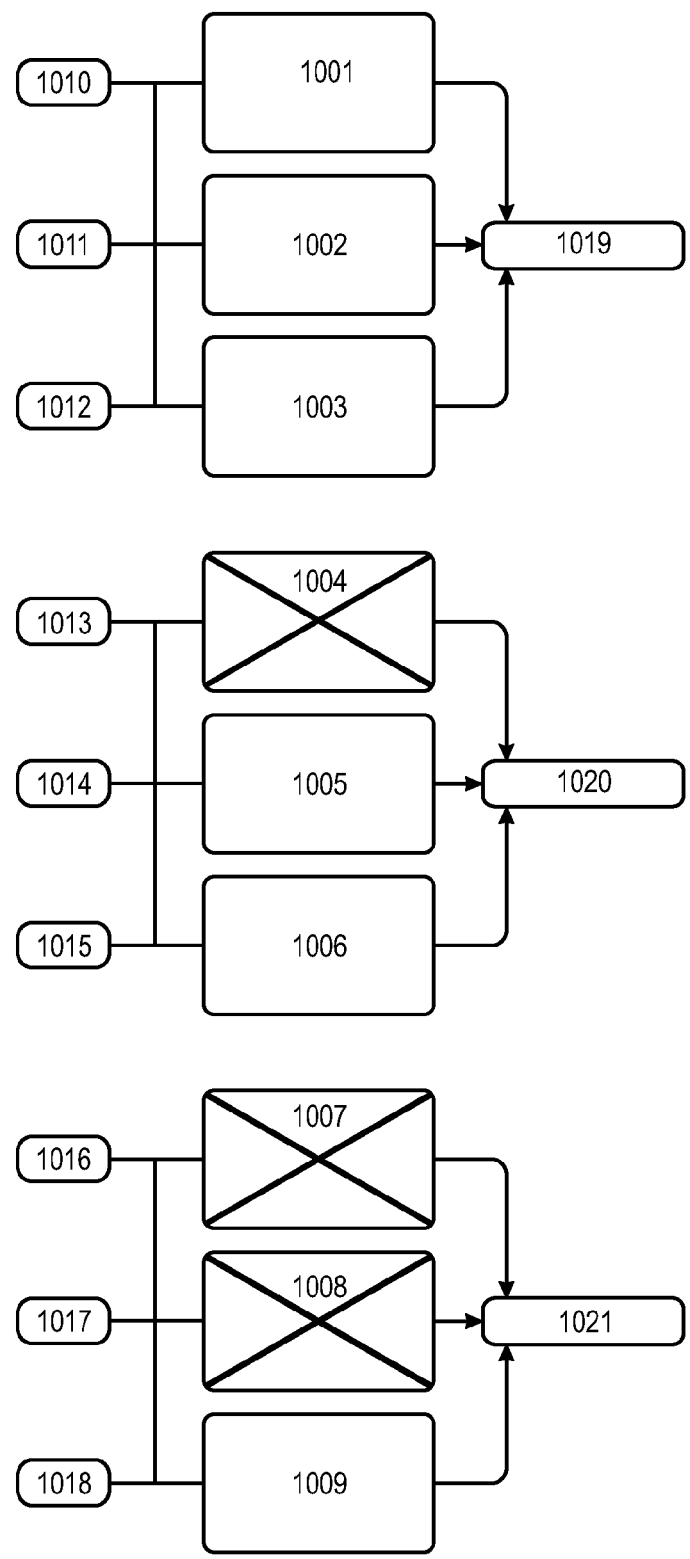
FIG. 10 shows an exemplified double-fault scenario in a double fault-tolerant system.

FIG. 10 shows a generic reliability network view on double fault-tolerant fail-silent DCNs 1001-1009 adapted to control objects 1019-1021. Sensors values from sensors 1010-1018 are available to the DCNs 1001-1009 as data on the RTCN and optionally also as local sensor data. The sensor data can be utilized by the controllers in 2oo2 or 2oo3 redundancy schemes depending on the criticality of the function.

If the DCNs 1001-1009 operate on data available from the RTCN and not on internal data and if measures are taken to ensure that the DCNs operate on the same data, replica determinism can be supported.

The upper drawing of FIG. 10 shows a properly working wind turbine sub-system where sensor signals from sensors 1010-1012 are applied, via DCNs 1001-1003, to control object 1019.

In case of failure in one DCN 1004, continued operation is ensured by the replicated nodes 1005, 1006, see the middle drawing in FIG. 10. In case of failure in two DCNs 1007, 1008, continued operation may be ensured by the remaining node 1009, see the lower drawing in FIG. 10.

Figure 11:
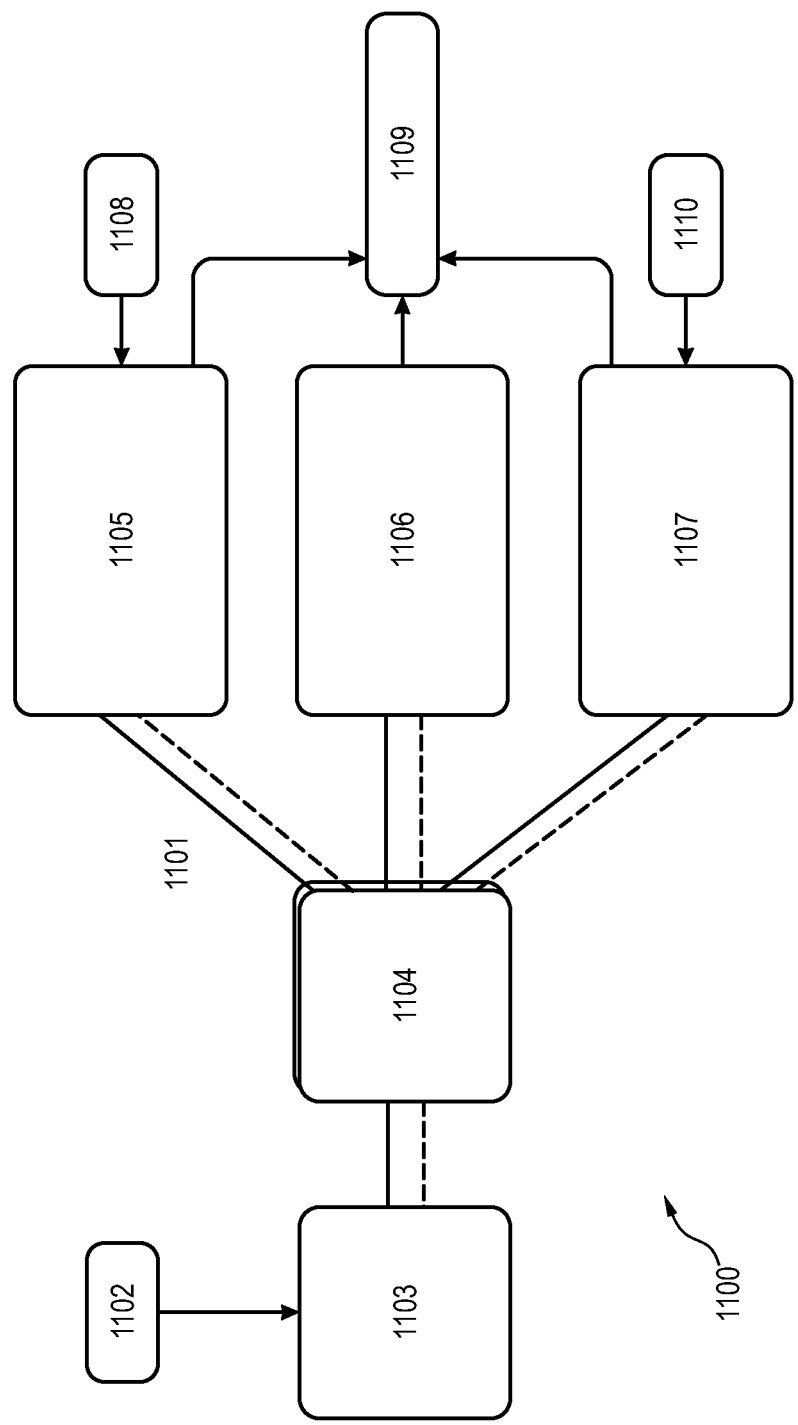
FIG. 11 shows an implementation view of a double fault-tolerant system.

The implementation of the double fault-tolerant functions in the controller platform, i.e. the DCNs, for controlling wind turbine object 1109 is exemplified in FIG. 11. The sensors 1108, 1110 are connected to the double fault-tolerant fail-silent DCNs 1105, 1107 and possibly to another DCN 1103 in the system. Sensor data from sensor 1102 are made available on the replicated RTCN 1101 via DCN 1103 and replicated RTCN switch 1104. The DCNs operate on the data available from the RTCN, not on internal data. If measures are taken to ensure that the DCNs operate on the same data, replica determinism can be supported. The solid and dashed lines of the RTCN 1101 illustrate the single redundancy of the RTCN 1101.

Fault Tolerance Utilizing n+m Redundancy

Figure 12:
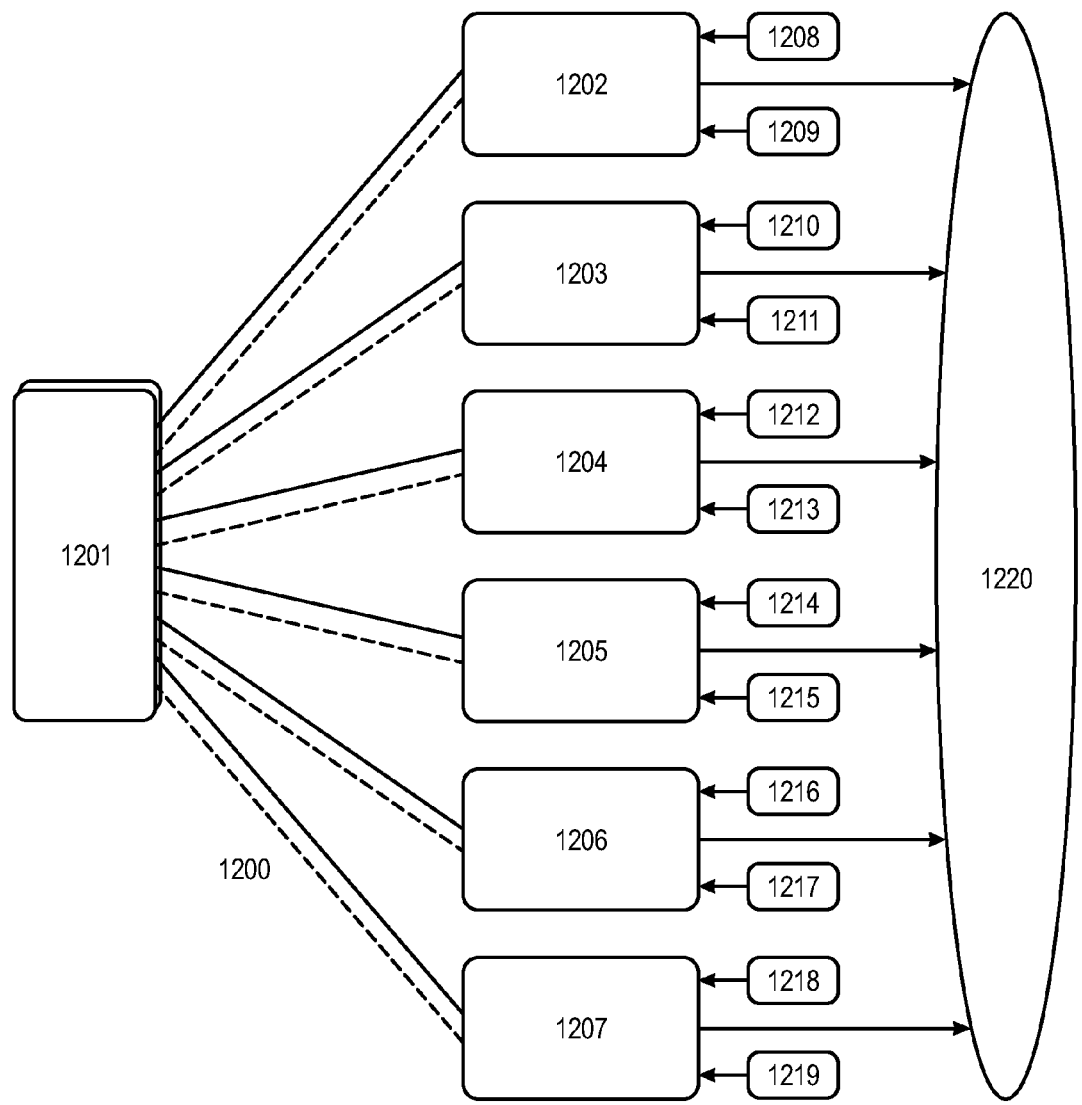
FIG. 12 shows an exemplified generic n+m redundant sub-system.

Some control systems can benefit from a fault-tolerant architecture utilizing n+m redundancy, see FIG. 12. FIG. 12 shows a single fault-tolerant RTCN 1200 (indicated by solid and dotted line) where a RTCN switch 1201 is in communication with six fail-silent DCNs 1202-1207. The six fail-silent DCNs 1202-1207 are configured to control a given object 1220 of a wind turbine in response to sensor inputs from sensors 1208-1219. The n+m redundancy is established by n+m replica deterministic DCNs 1202-1207 that jointly execute control of the controlled object 1220. Possible application areas for this type of redundancy could be yaw and/or power converter systems.

Figure 13:
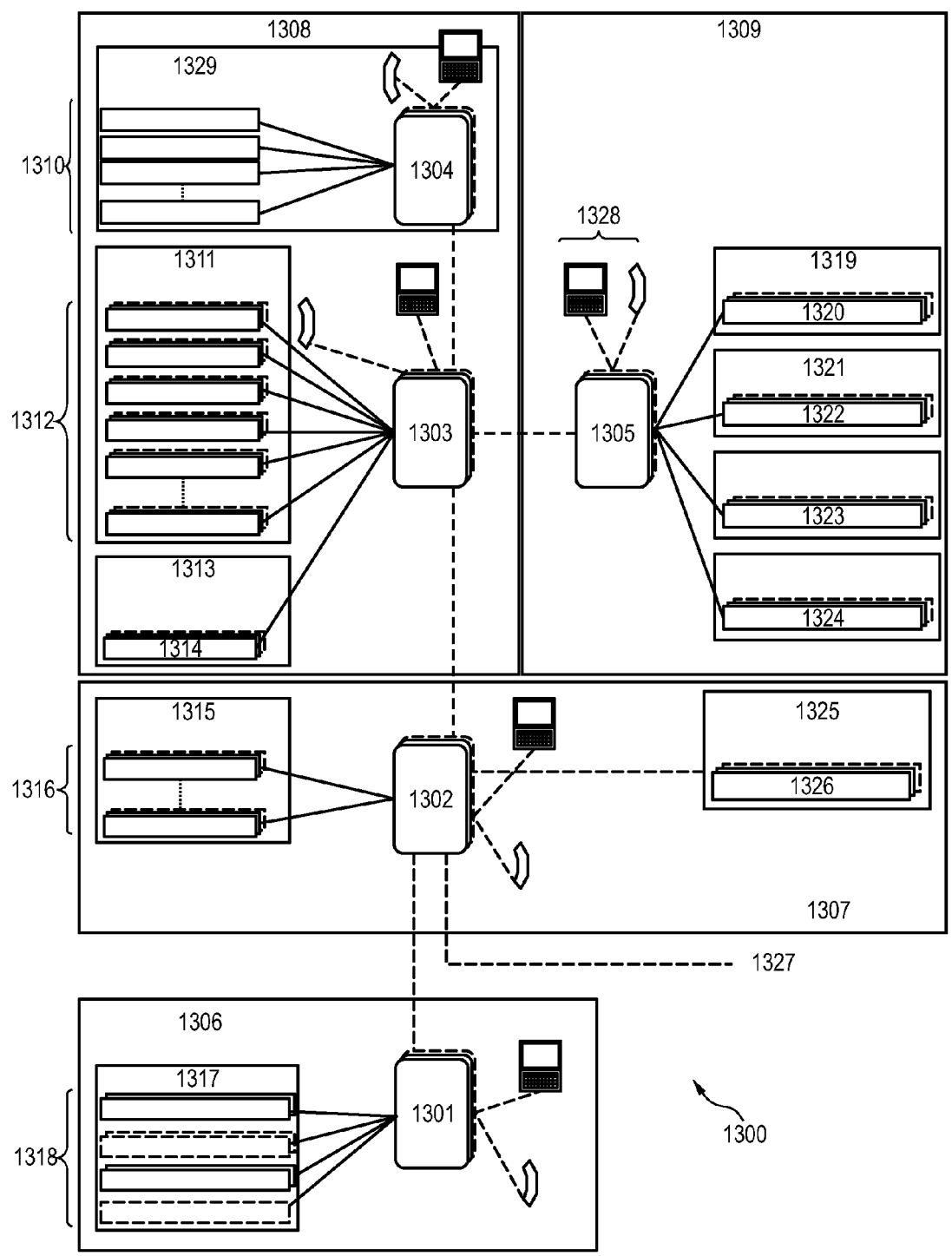
FIG. 13 shows a generic fault-tolerant control system in a wind turbine.

FIG. 13 illustrates a TTEthernet-based control architecture of a wind turbine 1300 including a wind turbine generator (WTG) sub-station 1306, a WTG tower 1307, a WTG nacelle 1308 and a WTG hub 1309. Generally, the TTEthernet network of FIG. 13 facilitates communication between WTG components 1306-1309 via replicated TTEthernet switches 1301-1305.

The WTG sub-station 1306 includes a sub-station controller 1317 which is in communication, via replicated (indicated as stacked) TTEthernet switches 1301, 1302, with replicated Tower Control Nodes 1316 of tower module 1315 and replicated WTG Main Controllers 1326 of tower module 1325.

The sub-station controller 1317 may contain various replicated controller or servers 1318, such as power controllers, power plant (PP) data server, additional sub-station controllers, SCADA etc.

The replicated TTEthernet switch 1302 of the WTG Tower 1307 facilitates connection to other WTGs via connection 1327.

Moreover, communication is provided, via replicated TTEthernet switches 1303, 1304, to replicated Nacelle Control Nodes 1312 of nacelle module 1311, replicated Distributed Power Controllers 1310 of nacelle module 1329 and replicated Centralized Master Safety Controllers 1314 of nacelle module 1313. The replicated Distributed Power Controllers 1310 may involve various controllers for various control schemes.

Finally, communication is provided, via replicated TTEthernet switch 1305, to replicated Blade Control Nodes (one node for each blade) 1322, 1323, 1324 of hub module 1321 and replicated Hydraulics Control Nodes 1320 of hub module 1319.

As previously mentioned suitable RTCNs may include Ethernet/IP, Ethernet POWERLINK, EtherCAT, SERCOS III, PROFInet-IRT, TTEthernet (as shown in FIG. 13) or other data communication networks with similar properties.

As depicted in FIG. 13 various communication means 1328, such as laptops, IP phones etc., may be connected to each of the TTEthernet switches.

The invention claimed is:

1. A fault-tolerant control system for a wind turbine comprising a plurality of controllable wind turbine components, the control system comprising:
a first controller for generating a plurality of replica set-point values, and
a data communication network for transmitting the plurality of replica set-point values to the plurality of controllable wind turbine components, wherein each of the plurality of controllable wind turbine components comprises a respective distributed control node configured to vote on the plurality of replica set-point values to select one set-point value out of the plurality of replica set-point values.

2. The fault-tolerant control system according to claim 1, further comprising a centralised main controller configured to generate reference signals for the first controller for generating the plurality of replica set-point values.

3. The fault-tolerant control system according to claim 1, further comprising a fault-tolerant sensor system comprising a plurality of sensors.

4. The fault-tolerant control system according to claim 3, wherein the plurality of sensors are arranged in a redundant manner.

5. The fault-tolerant control system according to claim 3, wherein the plurality of sensors are adapted to measure at least one electrical parameter.

6. The fault-tolerant control system according to claim 1, wherein the data communication network comprises a real-time communication network.

7. The fault-tolerant control system according to claim 6, wherein the real-time communication network comprises a time-triggered Ethernet.

8. The fault-tolerant control system according to claim 7, wherein the time-triggered Ethernet communication network is implemented as a single fault-tolerant network.

9. The fault-tolerant control system according to claim 7, wherein the time triggered Ethernet communication network is implemented as a double fault-tolerant network.

10. The fault-tolerant control system according to claim 6, wherein the real-time communication network supports safety-related communication of data.

11. The fault-tolerant control system according to claim 1, further comprising a global time.

12. The fault-tolerant control system according to claim 1, wherein the distributed control node is further configured to control the respective controllable wind turbine component based on the selected set-point value.

13. A wind turbine comprising:
a plurality of controllable wind turbine components; and
a fault-tolerant control system, comprising:
a first controller for generating a plurality of replica set-point values, and
a data communication network for transmitting the plurality of replica set-point values to the plurality of controllable wind turbine components, wherein each of the plurality of controllable wind turbine components comprises a respective distributed control node configured to vote on the plurality of replica set-point values to select one set-point value out of the plurality of replica set-point values.

14. The wind turbine according to claim 13, wherein the plurality of controllable wind turbine components is selected from the group consisting of: pitch components, yaw components, main shaft components, gear components, generator components, power stop components, hydraulic station components, water pump components, cooling components, and an uninterruptable power supply.

15. The wind turbine according to claim 13, further comprising a centralised main controller configured to generate reference signals for the first controller for generating the plurality of replica set-point values.

16. The wind turbine according to claim 13, further comprising a fault-tolerant sensor system comprising a plurality of sensors arranged in a redundant manner.

17. A method of controlling a wind turbine comprising a plurality of controllable wind turbine components, the method comprising:

generating a plurality of replica wind turbine component set-point values using a first controller;

transmitting the plurality of replica set-point values to the plurality of controllable wind turbine components in the wind turbine via a data communication network;

performing, at each wind turbine component, a decentralised voting process comprising the step of selecting one set-point value out of the plurality of replica set-point values; and controlling a first controllable wind turbine component of the plurality of controllable wind turbine components using the selected set-point value.

18. The method according to claim 17, wherein more than one of the plurality of controllable wind turbine components in the wind turbine is controlled via the selected set-point value.

19. The method according to claim 17, further comprising a centralised main controller configured to generate reference signals for the first controller for generating the plurality of replica set-point values.

20. The method according to claim 17, further comprising a fault-tolerant sensor system comprising a plurality of sensors arranged in a redundant manner.

* * * * *